Figure 1:
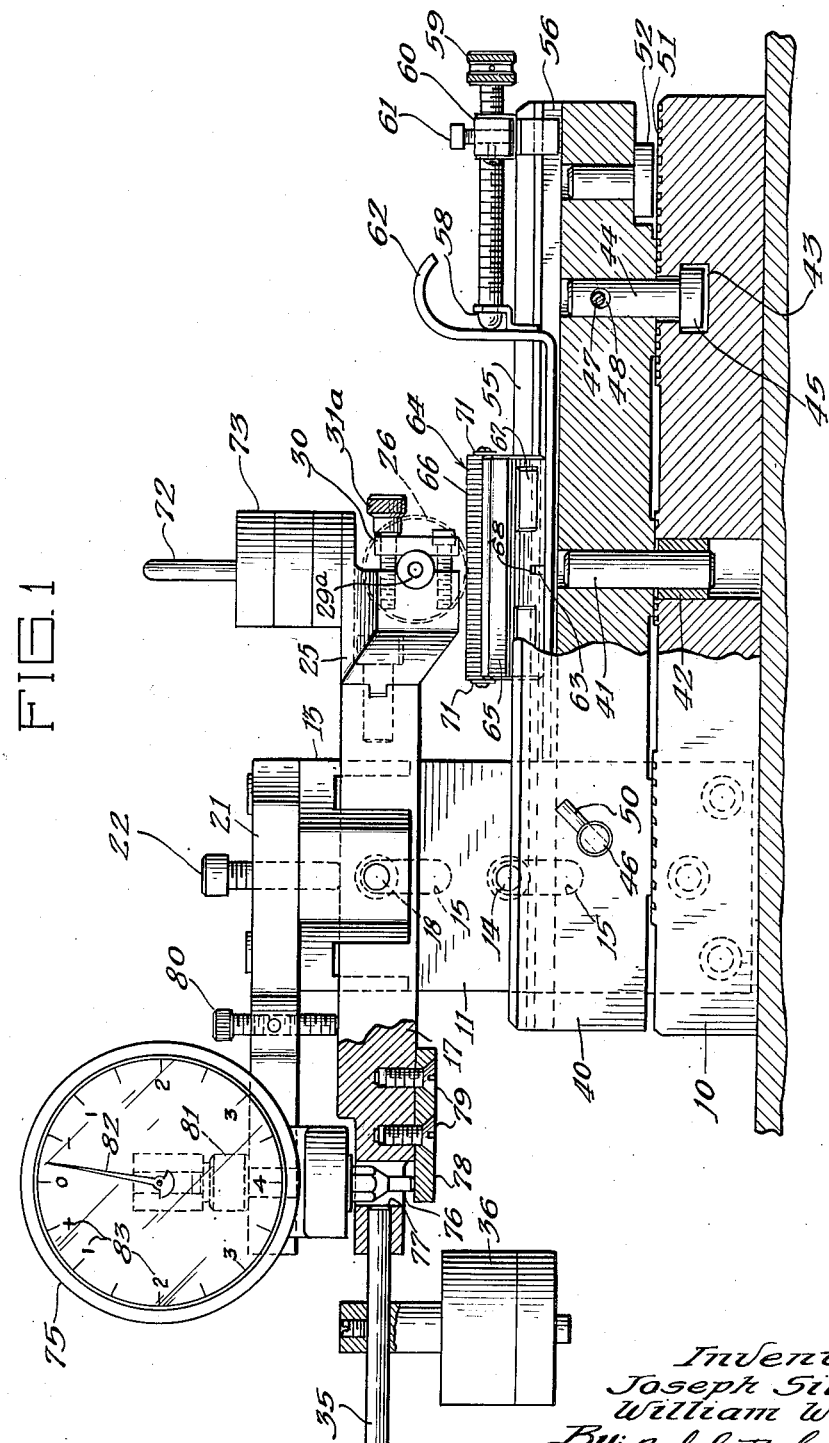

Oct. 23, 1956　　　J. SITTLER ET AL　　　2,767,479
GEAR CHECKING DEVICE
Filed Sept. 14, 1953　　　　　　　　　　4 Sheets-Sheet 1

Inventors:
Joseph Sittler
William Wall
By: Zabel, Baker, York,
Jones & Dithmar
Attorneys Oct. 23, 1956     J. SITTLER ET AL     2,767,479
GEAR CHECKING DEVICE
Filed Sept. 14, 1953     4 Sheets-Sheet 2
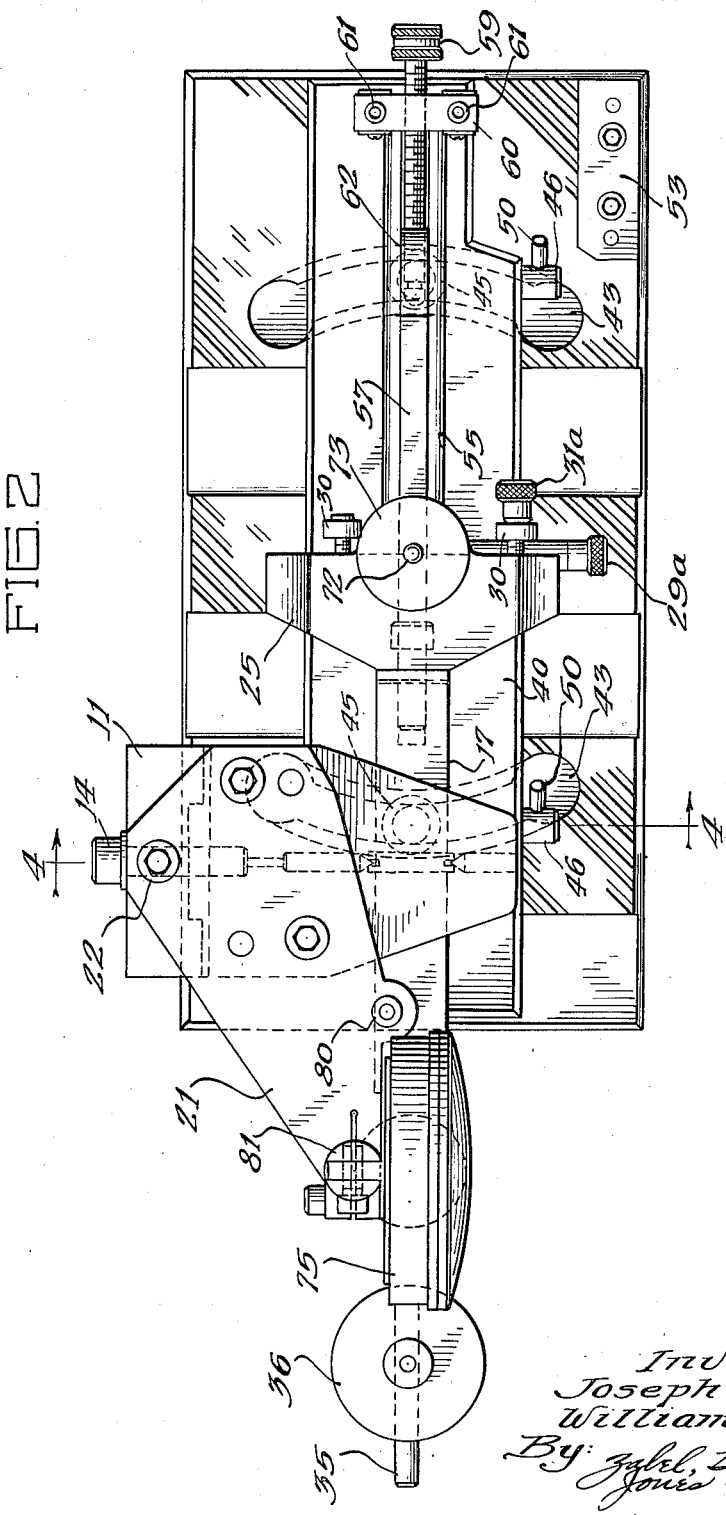

Oct. 23, 1956  J. SITTLER ET AL  2,767,479
GEAR CHECKING DEVICE
Filed Sept. 14, 1953  4 Sheets-Sheet 3
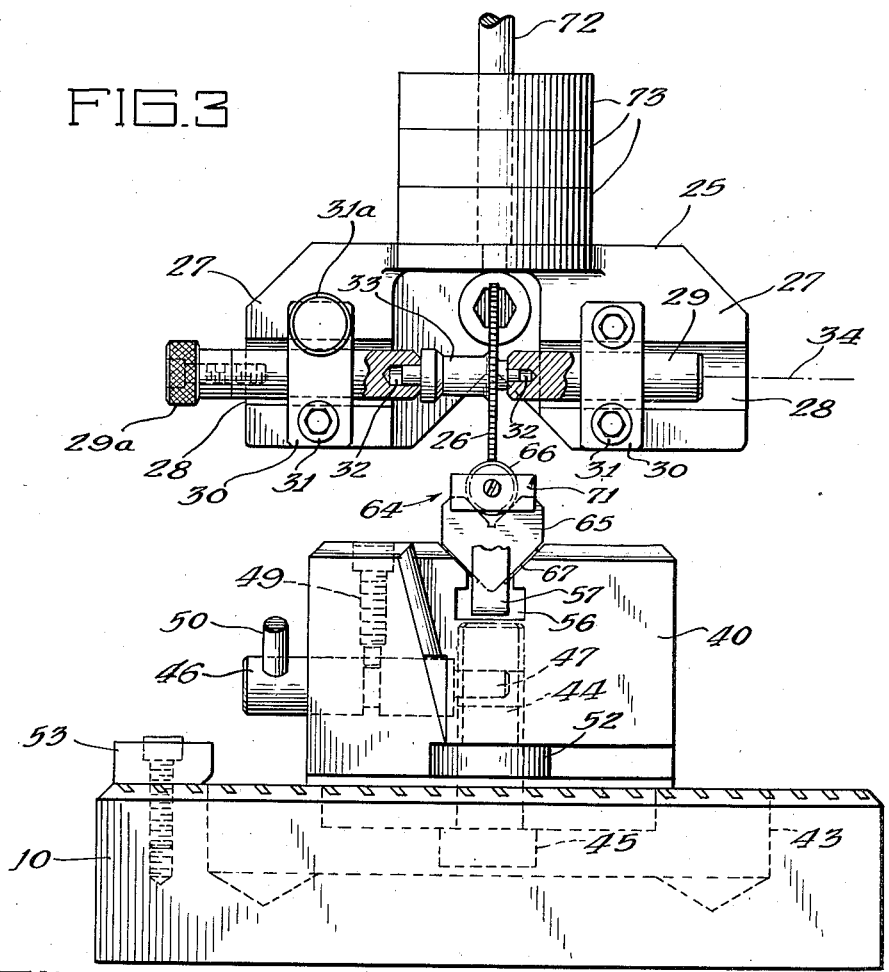
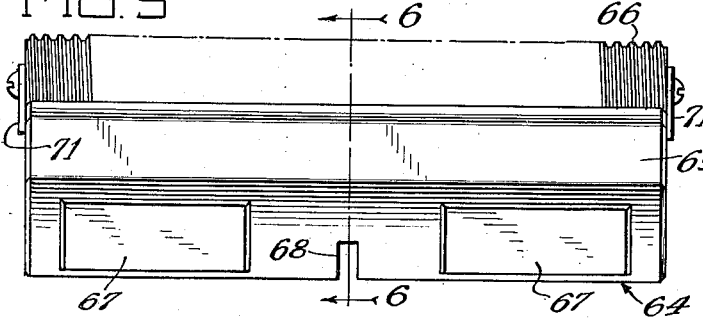
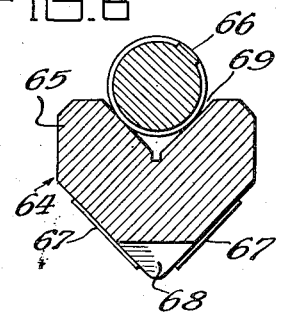
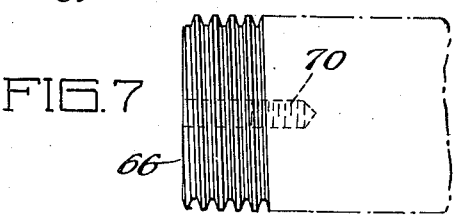
Inventors:
Joseph Sittler
William Watt
By Zabel, Baker, York,
Jones & Dithmar
Attorneys Oct. 23, 1956    J. SITTLER ET AL    2,767,479
GEAR CHECKING DEVICE
Filed Sept. 14, 1953    4 Sheets-Sheet 4

Inventors:
Joseph Sittler
William Wall
By: Zabel, Baker, York,
Jones & Dithmar
Attorneys.

United States Patent Office 2,767,479
Patented Oct. 23, 1956

2,767,479

GEAR CHECKING DEVICE

Joseph Sittler, Berwyn, and William Wall, Chicago, Ill., assignors to Revere Camera Company, Chicago, Ill., a corporation of Delaware Application September 14, 1953, Serial No. 379,802

10 Claims. (Cl. 33—179.5)

This invention relates to an improved gear checking device.

Gears may be checked for irregularities in tooth size, tooth form, eccentricity, and wobble by two methods. One method is by rolling the gear in mesh with a master or gauge gear and noting variations in the distance between the centers. The second method is by rolling the gear on a gauge rack and observing or recording the up and down movement of the gear center. Whereas the present invention in its broader aspects is applicable to either type of gauge, the embodiment illustrated herein is shown as applied to a rack or worm type of gauge.

A device of this type includes a base, a gear holder and a gauge holder. For checking helical gears, the gear holders of prior art devices have been mounted for angular adjustment with respect to the gauge holder and base. According to the present invention, greater accuracy is obtained by mounting the gauge holder for angular adjustment with respect to the gear holder and base.

It is an object of this invention to provide an improved gear checking device which is capable of checking both spur gears and helical gears with great accuracy.

Another object is to provide a gear checking device which embodies fewer moving parts than previously known devices of this type, and which provides improved means for holding the axis of the gear to be checked parallel to the plane of relative pivotal movement of the gear holder and gauge holder.

A further object is to provide a device of this type in which the operating force between the gear and gauge can be regulated; in other words, the present invention provides an arrangement in which the gear rests on the gauge, and it provides means by which a uniform load can be imposed on the gear to the end that consistent and accurate results can be obtained.

Another object of the invention is to provide a gear checking device which operates with a minimum of side wiping action of the gear with respect to the gauge, thereby improving gauge life.

Still another object is to provide a gear checking device having improved means for removably mounting a gear.

Still another object of the invention is to provide a gear checking device having an improved type of gauge, the working surface of which can be shifted from time to time, as wear may occur to present a fresh and unworn working surface.

Certain of the foregoing objects are obtained by the provision of a gear checking device in which the gear to be checked is mounted on a balance beam having a fixed fulcrum, and in which the gauge is mounted on a pivotally mounted gauge holder. The invention provides means by which the center point of the gear may be positioned along the pivot axis of the gauge holder. The term "center point" is used herein to designate the point of intersection between the gear axis and a medial plane of the gear.

Other objects, features and advantages will become apparent as the description proceeds.

Figure 8:
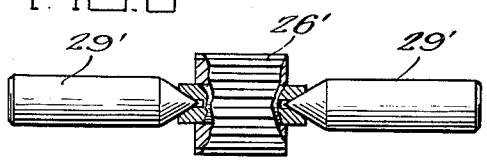
Figure 9:
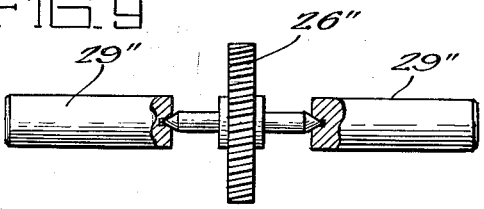
Figure 4:
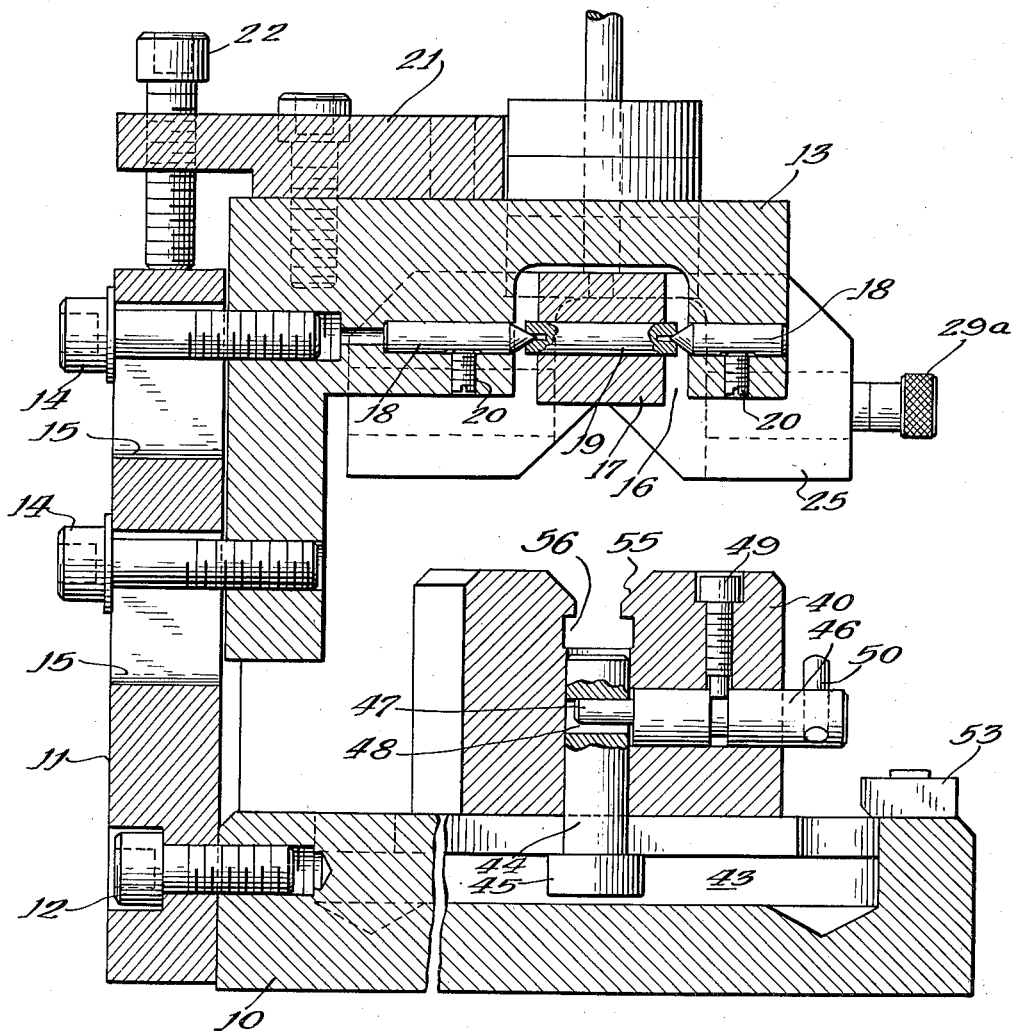

With reference now to the drawings in which like reference numerals designate like parts:

Fig. 1 is a front elevation, partly in section, of a preferred embodiment of this invention;
Fig. 2 is a plan view of Fig. 1;
Fig. 3 is a right end view of Fig. 1;
Fig. 4 is a section taken along line 4—4 of Fig. 2;
Fig. 5 is an elevation of the gauge;
Fig. 6 is a section taken along line 6—6 of Fig. 5;
Fig. 7 is a plan view of the worm showing the helix angle of the worm thread for which compensation is provided; and
Figs. 8 and 9 show modified types of centers.

With reference now to Figs. 1–4, the device includes a base 10 in which is secured a post 11 by means of screws 12. A bracket 13 is adjustably mounted on the post 11 by screws 14, as shown in Fig. 4. The post is provided with slots 15 through which the screws 14 extend so that the position of the bracket can be adjusted. The bracket is cut away as indicated by the reference numeral 16, thus providing a yoke to accommodate a scale type beam 17.

The beam is suspended or balanced from the bracket 13 by means of pivots 18, the points of which engage a suitable bearing plug 19 which is mounted in the beam 17. The elements 18 and 19 are preferably made of hardened steel and provide a low friction and delicate fulcrum for the beam 17, care being taken that the axes of the three elements are accurately aligned. Set screws 20 secure the pivots 18 in place.

A horizontal plate 21 is suitably secured to the upper surface of the bracket 13, and it overhangs the post 11. An adjusting screw 22 is threaded into the overhanging portion of the plate 21 and bears against the top surface of the post 11 so that the elevation of the bracket 13 and the beam 17, with respect to the base 10, may be accurately determined prior to the time the adjusting screws 14 are tightened up.

The right hand end, as viewed in Fig. 1, of the beam 17 terminates in a yoke 25, so that a gear 26 to be tested may be mounted between the arms of the yoke. Such a gear is shown, for purposes of illustration, in Fig. 3. The yoke is provided with aligned vertical faces 27 in which are formed aligned V grooves 28. Centers 29 are mounted and maintained in the grooves 28 by means of plates 30 which are held in position by screws 31, as shown in Figs. 1 and 3. One of the screws may be provided with a knurled head 31a so that one plate can be loosened and its arbor partially withdrawn when it is desired to replace the gear 26. Similarly, one of the centers 29 is provided with a knurled head 29a to facilitate manipulation thereof.

The centers 29 are provided with aligned bores 32 which are adapted to receive the hub 33 of the gear 26.

In this particular instance, the gear 26 to be tested is shown with a special hub which calls for centers 29 having specially formed bores 32 to accommodate the shaft of the hub. However, standard male centers 29' or standard female centers 29", as shown in Figs. 8 and 9, may be provided to accommodate standard types of gears and pinions 26' and 26" either with or without arbors.

Where interchangeable centers are used, it is important that the diameter of the centers be uniform so that the axis 34 of the centers will not be shifted. The V grooves 28 and the centers 29 provide means for maintaining the axis of the gear 26 aligned and coincident with the axis 34 with great accuracy. The axis 34 is parallel with the axis of the pivots 18, and hence are perpendicular to the longitudinal axis of the beam 17.

The left hand end of the beam 17 supports a rod 35 on which is slidably mounted a weight 36. In the normal operation of the machine, it is intended that the beam 17 be balanced after the gear 26 has been mounted thereon. Thus, the weight 36 provides convenient means for compensating for the weight of the particular gear 26.

The gear 26 is adapted to be brought into rolling engagement with a slidably mounted gauge 64 disposed beneath the gear 26. To this end, a gauge holder 40, resting on grooved lands 51 of the base 10, is pivotally mounted on the base 10 by means of a pivot pin 41, the axis of which intersects the center axis 34. A suitable bushing 42 is provided in an aperture formed in base 10 to receive the pivot pin 41. The axis of the pivot pin preferably intersects the longitudinal axis of the beam 17 as well as the axis 34.

The base 10 is provided with two arcuate T slots 43, shown in Figs. 1 and 2. Guide pins 44 are disposed in suitable bores in the holder 40, and the heads 45 of the guide pins are received in the T slots 43. Lock shafts, located in suitable bores in the holder 40, are provided to draw up on the guide pins 44 so that the holder 40 may be clamped in any given angular position. As shown in Fig. 4, each lock shaft 46 terminates in an eccentric pin 47, the pin extending into an opening 48 in the guide pins 44. Set screws 49 are provided for the lock shaft, and hand levers 50 are also provided to facilitate operation of the same.

When the levers 50 are swung downwardly, the holder 40 may be swung to any desired angular position with respect to the beam. Then the holder is locked in this position by swinging the levers 50 upwardly which causes the guide pins to be drawn up in their T slots into clamping position. They are maintained in clamped position by the set screws 49.

Means are provided to determine the angular position of the holder with great accuracy. This means comprises a sine bar roll 52 carried by the holder 40, and a fixed abutment 53 mounted on the base 10. Thus by inserting suitable gauge blocks (not shown), such as Johansson gauge blocks, between the sine bar roll 52 and the abutment 53, the angular position of the holder 40 may be determined with great accuracy. In effect, the holder 40 comprises a sine bar.

The upper surface of the holder 40 is provided with a V groove 55 which communicates with a slot 56, as shown in Fig. 4. A slide 57, as shown in Figs. 2 and 3, is disposed in the slot 56, and the right end thereof terminates in a yoke 58. A screw 59 is threaded through a block 60, as shown in Fig. 1, the left end of the screw being grooved and embraced by the yoke 58. The block 60 is secured to the base by suitable screws 61. Thus, by rotating the screw 59, the slide can be moved from left to right within the slot 56. However, when desired, the block 60 can be removed, and the screw 59 disengaged from the yoke 58, this condition of the parts being shown in Fig. 3. Then the slide 57 can be moved back and forth manually by means of a suitable handle 62 which is provided on the slide 57. The slide 57 is provided with an upstanding pin 63 which engages the gauge 64 as pointed out hereinafter.

As shown in Figs. 5 and 6, the gauge 64 comprises two parts, a carrier 65 and a worm 66. The lower portion of the carrier 65 is V-shaped and is provided with pads 67 which engage and slide on the walls of the V-groove 55. A slot 68 is formed in the bottom of the V-shaped carrier into which the pin 63 is adapted to extend. Thus, as the slide 57 is moved back and forth, either by the handle 62 or by the screw feed 59, the gauge will be moved longitudinally of the holder 40.

The upper surface of the carrier 65 is formed with a V groove 69, preferably 90 degrees in which the worm 66 rests. As shown in Fig. 5 the worm at each end is provided with a tapped bore 70 to accommodate a screw clip 71 which engages the end surfaces of the carrier 65.

Thus, the worm, which is slightly shorter than the carrier is held in the carrier against longitudinal displacement. To present a fresh gauge surface, one screw clip can be loosened and the worm rotated a few degrees, after which the screw clip is again tightened up.

In order that the force with which the gear 26 is urged into engagement with the gauge 64 may be determined, the yoke 25 is provided with loading means. This includes a spindle 72 mounted on the upper surface of the yoke, and one or more weights 73. Thus, after the beam 17 has been balanced, the exact working force can be determined merely by adding suitable weights 73 to the spindle 72.

Means are provided to indicate the extent of displacement of the beam 17, due to irregularities in the gear 26. This means includes a dial indicator 75 which is suitably mounted on the horizontal plate 21. The dial indicator includes a plunger 76 which extends through an aperture 77 formed in the beam 17. A suitable hardened wear plate 78 is secured to the undersurface of the beam 17 by screws 79, and bears against the end of the plunger 76. Thus, the plunger 76 is protected from inadvertent blows, since it is disposed within the aperture 77. A stop screw 80 extends through the horizontal plate 21 and engages the beam 17 so as to limit displacement of the beam beyond the capacity of the plunger 76, thus affording additional protection to this delicate element.

The dial indicator 75 may preferably be provided with a fine adjustment in the form of a nut 81 by means of which the pointer 82 may be set to a zero mark for a given position of the beam 17. The indicia 83 may be in the terms of tens of thousandths, thus indicating a variation of plus or minus .004 inch on either side of the zero position, and providing clear indication of variations measured in hundredths of thousandths.

To summarize the operation, the bracket 13 is first adjusted to the proper elevation for the diameter of the gear to be tested, this being done by means of adjusting screws 22 and 14. Then a gear 26 is inserted between the centers 29, and the knob 31a is tightened up. The weight 36 is then adjusted so as to bring the beam 17 into balance.

The proper gauge 64 is then selected and placed on the slide 57. The helix angle of the worm thread of the gauge will be stamped on the worm, either in terms of angular measurement or of its sine so that the holder 40 may be properly oriented by means of suitable gauge blocks, after which the handles 50 of the lock shafts 46 are tightened up and set by the set screws 49. At this time, assuming that the gear 26 is a spur gear, its teeth should mesh with the gauge 64, and the gauge may be moved under the gear. Then the proper loading may be applied by the weights 73.

Reciprocation of the gauge by means of handle 62, will cause certain movements of the pointer 82 to the right or left of an average position, thus indicating imperfections in the gear 26. If preferred the nut 81 may be set so that the zero position of the indicator will coincide with the average position to give a more direct reading. This is particularly desirable when a series of identical gears are to be checked.

Preferably the beam fulcrum is exactly midway between the plunger 76 and the center axis 34, so that a direct reading may be obtained from a standard type of gauge. However, these proportions may be changed so as to give any reasonable degree of magnification.

An important feature of the present invention is that the gear to be tested is supported at both ends and thus firmly mounted with respect to a fixed axis. The arrangement provides short centers 29 so that there will be no flexing thereof. When the gear is cantilevered on a fixture it is more subject to canting, and therefore it will not ride on the top of the worm which is the only position for which the worm thread lead is accurately compensated.

By using a worm of small radius, and thus reducing the area of contact, the side wiping action is kept to a minimum when checking helical gears. This materially reduces gauge wear for the reason that dust particles are always present. Furthermore, when wear does occur, a fresh gauge surface can be provided by a relatively simple adjustment.

Dust particles and loose burs are also likely to throw off the reading; this likelihood is reduced by providing a worm of small radius which reduces the area of contact.

Although only a preferred embodiment of the invention has been shown and described herein, it will be understood that various modifications and changes may be made in the construction shown without departing from the spirit of the invention as pointed out in the appended claims.

We claim:

1. A gear checking device comprising a base, a balance beam pivotally mounted above the base and being provided at one end with a yoke member, gear holding means including centers removably mounted on said yoke, and providing a fixed center axis, a gauge holder pivotally mounted on said base beneath said yoke, pivot means connecting said base and said gauge holder and arranged so that the vertical axis thereof intersects said center axis at 90 degrees, said gear holding means providing means for mounting a gear in said yoke so that the axis of said gear is coincident with said center axis and so that said vertical pivot axis lies between the side faces of said gear, a worm carrier slidably mounted on said gauge holder for longitudinal movement, and provided in its upper surface with a V-shaped groove, a gauge worm disposed in said V-shaped groove, a sine bar roll mounted on said carrier, a fixed abutment on said base and spaced from said sine roll, whereby gauge blocks may be placed between said sine roll and said abutment to determine the angular displacement of said gauge holder with respect to the longitudinal axis of said beam to compensate for the lead of the thread of said worm in order that said worm threads may be oriented parallel to the teeth of said gear at their point of contact with said teeth, means disposed on said yoke for supporting a weight so as to provide a predetermined force urging said gear into contact with said worm, and indicating means fixedly mounted with respect to said base and having a displaceable member engaging said beam whereby displacement of said beam will be indicated as said worm carrier is shifted longitudinally of said pivotally mounted holder.

2. A gear checking device comprising a base, a counter-balanced balance beam pivotally mounted above said base and being provided at one end with a yoke member, loading means disposed above said yoke member, gear holding means mounted on said yoke member and providing a horizontal axis of rotation for a gear to be checked, a gauge holder pivotally mounted on said base beneath said yoke for pivotal movement in a horizontal plane about a vertical axis which is perpendicular to and intersects said horizontal gear axis, a gauge worm slidably mounted on said gauge holder for movement in a direction generally parallel with the axis of said beam and adapted to mesh with a gear held by said gear holding means whereby said balance beam will be displaced against the force of said loading means by irregularities in the teeth of the gear to be tested, and means for adjusting the angular orientation of said gauge worm with respect to its longitudinal axis whereby a fresh gauging surface may be provided for testing purposes.

3. A gear checking device as claimed in claim 2 including indicating means mounted on said base and having a displaceable member engaging said beam to indicate displacement of said beam.

4. A gear checking device comprising a base, a balance beam pivotally mounted above said base and being provided at one end with a yoke member, gear holding means mounted on said yoke member and providing a horizontal axis of rotation for a gear to be checked, a gauge holder pivotally mounted on said base beneath said yoke for pivotal movement in a horizontal plane about a vertical axis which is perpendicular to and intersects said horizontal gear axis, a gauge rack slidably mounted on said gauge holder for movement in a direction generally parallel with the axis of said beam and adapted to mesh with a gear held by said gear holding means whereby said balance beam will be displaced by irregularities in the teeth of the gear to be tested, indicating means mounted on said base and having a displaceable plunger adapted to be actuated by movement of said beam whereby said irregularities in the teeth of the gear to be tested will be indicated by said indicating means, said beam being provided with a vertically disposed opening therein, means associated with said beam and disposed within said opening and providing a plunger contacting surface, said plunger extending into said opening and engaging said plunger contacting surface whereby said plunger is protected by said beam, an adjustable balancing weight mounted on the other end of said balance beam, and loading means disposed above said yoke member.

5. A gear checking device as claimed in claim 4 including a set screw to limit displacement of said beam toward said plunger.

6. A gear checking device as claimed in claim 2 in which said yoke member is provided with vertically disposed end surfaces, aligned and horizontally disposed V grooves formed in said end surfaces, and in which said gear holding means comprise cylindrical centers of identical diameter disposed within said V grooves, in combination with screw threaded means for clamping said cylindrical centers into said V grooves.

7. A gear checking device as claimed in claim 2 having a sine bar roll mounted on said gauge holder, and a fixed abutment mounted on said base and spaced from said sine roll, whereby gauge blocks may be placed between said sine bar roll and said abutment to determine the angular displacement of said gauge holder with respect to the longitudinal axis of said beam.

8. A gear checking device comprising a base, a balance beam pivotally mounted above said base and being provided at one end with a yoke member, gear holding means mounted on said yoke member and providing a horizontal axis of rotation for a gear to be checked, a gauge holder pivotally mounted on said base beneath said yoke for pivotal movement in a horizontal plane about a vertical axis which is perpendicular to and intersects said horizontal gear axis, said balance beam being provided at the other end with an adjustable balancing weight, indicating means mounted on said base and engaging said beam to indicate displacement thereof, and means disposed above said yoke member for supporting a weight of predetermined mass whereby a gear held in said gear holding means can be urged into engagement with a gauge rack slidably mounted on said gauge holder with a predetermined force.

9. A gear checking device as claimed in claim 8 in which said gauge holder is provided with a longitudinally extending track, in combination with a gauge rack slidably mounted on said track, said vertical axis passing through the longitudinal axis of said gauge rack whereby a portion of said gauge rack will always be immediately beneath a gear held in said gear holding means.

10. A gear checking device as claimed in claim 9 in which said gauge rack comprises a worm carrier, and a worm disposed in said carrier for rotation about its longitudinal axis whereby the line of tangency between a horizontal plane and the top of said worm will intersect said vertical axis about which said gauge holder is pivoted.

References Cited in the file of this patent

UNITED STATES PATENTS 1,222,392    Green   ------------------ Apr. 10, 1917

(Other references on following page)

UNITED STATES PATENTS

| | | |
|---|---|---|
| 2,060,803 | Falk | Nov. 17, 1936 |
| 2,309,142 | Stafford | Jan. 26, 1943 |
| 2,394,623 | Martin | Feb. 12, 1946 |
| 2,447,445 | Widen | Aug. 17, 1948 |
| 2,669,028 | Femina | Feb. 16, 1952 |
| 2,639,509 | Rinker | May 26, 1953 |

FOREIGN PATENTS

| | | |
|---|---|---|
| 191,965 | Great Britain | Jan. 25, 1923 |
| 734,672 | France | Mar. 10, 1933 |

OTHER REFERENCES

American Machinist, pgs. 97 and 98, Feb. 18, 1943.
Machine Design, pgs. 128–130, June 1948.